United States Patent
Howenstine et al.

(10) Patent No.: US 6,911,745 B1
(45) Date of Patent: Jun. 28, 2005

(54) WINDMILL APPARATUS

(76) Inventors: Mervin W. Howenstine, 7817 Smolley Way, Citrus Heights, CA (US) 95610; Allan E. Schrum, 23577 Suncrest Ave., Moreno Valley, CA (US) 92553

(*) Notice: Subject to any disclaimer, the term of this patent is extended or adjusted under 35 U.S.C. 154(b) by 0 days.

(21) Appl. No.: 10/768,051

(22) Filed: Feb. 2, 2004

(51) Int. Cl.[7] .............................................. F03B 133/00
(52) U.S. Cl. .............................. 290/55; 290/44; 290/43; 290/53; 290/54
(58) Field of Search .............................. 290/55, 44, 43, 290/53, 54

(56) References Cited

U.S. PATENT DOCUMENTS

| | | | | |
|---|---|---|---|---|
| 4,079,264 A | * | 3/1978 | Cohen ........................ | 290/55 |
| 4,140,433 A | * | 2/1979 | Eckel ........................ | 415/209.1 |
| 5,664,418 A | * | 9/1997 | Walters ........................ | 60/398 |
| 6,448,668 | * | 9/2002 | Robitaille ................... | 290/54 |
| 6,800,955 | * | 10/2004 | McDavid, Jr. ............... | 290/54 |

* cited by examiner

Primary Examiner—Darren Schuberg
Assistant Examiner—Iraj A. Mohandesi
(74) Attorney, Agent, or Firm—Theodore J. Bielen, Jr.

(57) ABSTRACT

A windmill apparatus utilizing a base having a partition forming a chamber. Vanes are also included and possess means for pivoting the same. Each vane has a portion that moves along an arcuate path within the chamber. The base rotates around a central pivot by wind that enters the chamber and impinges on the vanes.

15 Claims, 5 Drawing Sheets

WINDMILL APPARATUS

BACKGROUND OF THE INVENTION

The present invention relates to a novel and useful windmill apparatus.

The harnessing of wind power has taken place for thousands of years. Wind turbines or windmills have been used to transfer wind energy into mechanical energy to mill grain, pump water, crush stones, and the like. Also, wind energy, attained through windmills, has been employed to generate electrical power.

The abundance of fossil fuels has, to a large extent, retarded the development of wind harnessing devices. However, the specter of a fossil fuel deficiency has emphasized the need to efficiently harness wind power along with other non-fossil fuel sources of energy such as tidal, movement, hydro-power, geothermal power, and the like.

In the past, windmills have typically involved the erection of a propeller-like mechanism atop a tower which is rotatable to face directly into the wind. The mechanical energy derived from such windmill structure is then used as needed. Although windmills have been efficiently designed, they include many drawbacks which directly affect the efficiency of the same. For example, existing windmills require a minimum wind velocity to operate which is relatively high. In addition, the erection of a tower and maintaining of the operating mechanism atop the tower results in a very high cost of maintenance and repair. Also, windmill blades are susceptible to the elements and exposure to birds and insects.

A windmill apparatus which overcomes many of the difficulties found in the prior art would be a notable advance in the field of energy generation.

BRIEF SUMMARY OF THE INVENTION

In accordance with the present invention a novel and useful windmill apparatus is herein provided.

The apparatus of the present invention utilizes a housing having a base, a wall portion extending from the base and a top overlying the wall portion. The housing does include a chamber with a wind entrance to the same and an exit therefrom. Housing may lie on a turntable to allow the housing to freely rotate.

At least one vane, and preferably a multiplicity of vanes, is located within the housing chamber. Each vane includes a hinge for rotating the same relative to the housing wall portion. Each vane also includes an end portion located distally from the hinge. Such the vane end portion moves in an arcuate path within the chamber. Each vane may be slightly curved to more efficiently gather the wind energy entering the chamber of the housing. A plurality of partitions or blocks lie within the chamber. A single partition is associated with each of the multiplicity of vanes located within the chamber. Each partition is formed with a leg having an arcuate surface. In this manner, the moving end portion of each vane associated with a particular partition moves immediately adjacent the arcuate surface of the partition to form a pocket to gather wind entering the chamber through the chamber entrance. A rotatable crank shaft provides an arm to each vane located within the chamber. Each arm is pivotally attached to each vane by a wrist pin between the hinge and the end portion of each vane. This arrangement forms a rotor assembly which turns about a pivot located on an axis. Thus, the wind impinging on vanes exposed to the wind moves the plurality of arms about the axis of the crank shaft which, in turn, moves each vane about its wrist hinge and its hinge. The movement of the rotor assembly generates useful work or power. For example, the rotor assembly may link to exciters which are moved in close proximity to coils to generate electrical power.

The exit of the chamber may be connected to a chute or tail portion which includes a passageway for the air exiting the chamber after interaction with the vane or plurality of vanes within the chamber. Needless to say, such chute has a passageway which communicates with the exit of the chamber and itself includes an exit. One or more of venturi nozzles may be located in the chute to communicate with the passageway in order to reduce the pressure in the passageway and to turn the housing of the windmill apparatus about the pivot at the base of the housing in response to the changing direction of the wind powering the windmill apparatus. In other words, a portion of the wind impinging on a particular vane or vanes acts to turn the housing and attached chute as well as the vanes themselves about each hinge, via the crank shaft and crank shaft arms.

It may be apparent that a novel and useful windmill apparatus has been hereinabove described.

It is therefore an object of the present invention to provide a windmill apparatus which efficiently harnesses the power of the wind to generate useful power or work.

Another object of the present invention is to provide a windmill apparatus which is operational in higher wind velocities than windmills of the prior art.

A further object of the present invention is to provide a windmill apparatus which may be constructed at a lower initial cost than windmills of the prior art.

A further object of the present invention is to provide a windmill apparatus which requires less maintenance than windmills of the prior art.

Another object of the present invention is to provide a windmill apparatus which initiates the generation of energy at a relatively low speed of rotation of the vanes within the windmill apparatus.

Another object of the present invention is to provide a windmill apparatus which includes rotors or vanes that are protected from the environmental damage inflicted by the elements, birds and insects, and the like.

Yet another object of the present invention is to provide a windmill apparatus which will self align with the wind direction in an efficient and effective manner.

Another object of the present invention is to provide a windmill apparatus which operates at a very low noise level.

A further object of the present invention is to provide a windmill apparatus which includes a high tolerance to temperature level changes in the environment surrounding the windmill apparatus.

Yet another object of the present invention is to provide a windmill apparatus which includes a mechanism to boost the rotational speeds of the vanes within the windmill apparatus through the use of a lower pressure passageway.

The invention possesses other objects and advantages especially as concerns particular characteristics and features thereof which will become apparent as the specification continues.

Fore a better understanding of the invention reference is made to the following detailed description of the preferred embodiment thereof which should be referenced to the following described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the prior delineated drawings.

Figure 1:
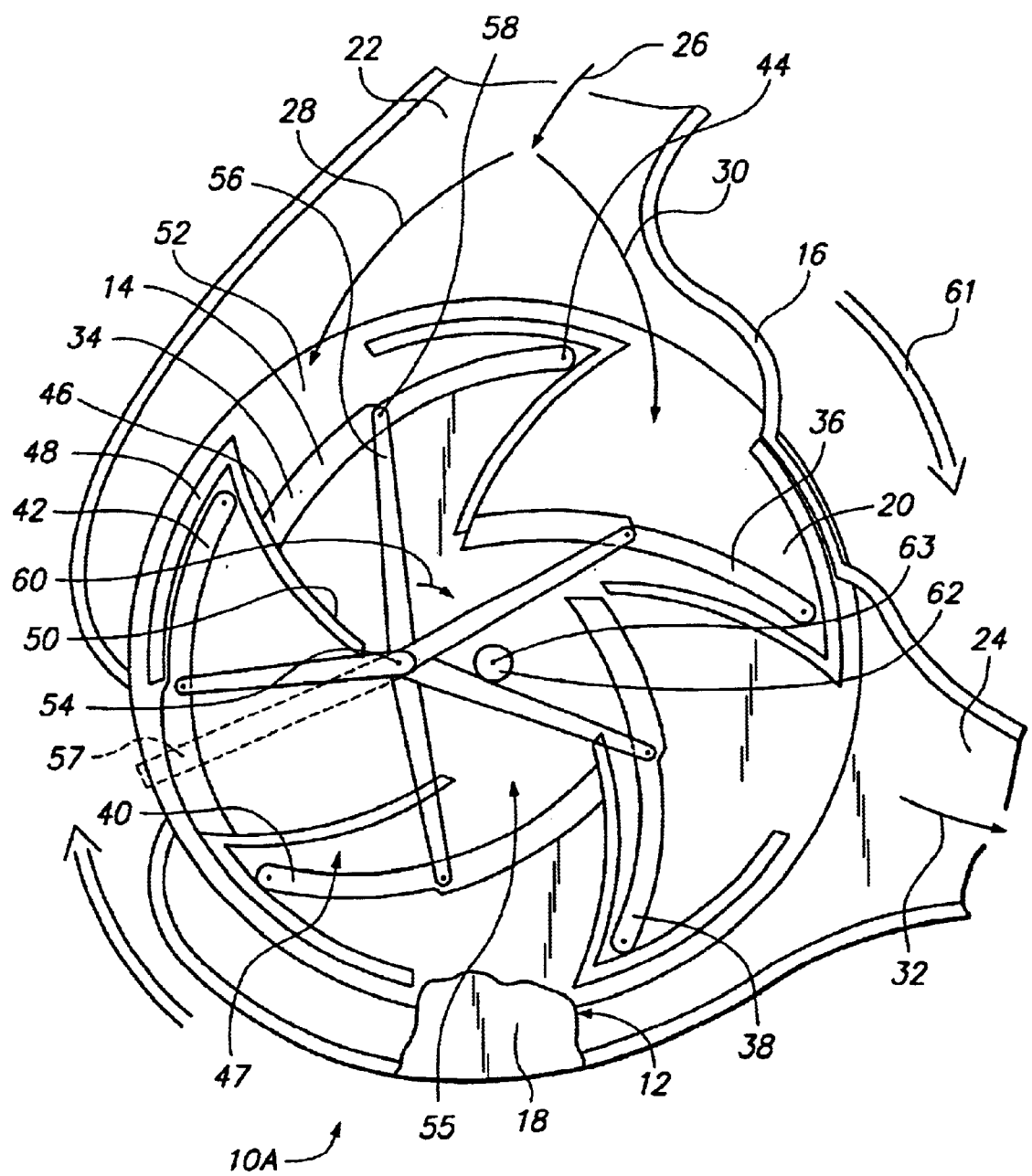
FIG. 1 is a top plan view of a first embodiment of the present invention with the top portion depicted in part.

The preferred embodiments of the invention are shown by reference character 10 with an uppercase letter following such numeral to depict distinctive embodiments. With reference to FIG. 1, embodiment 10A of the invention is shown. Windmill apparatus 10A includes as one of its elements a housing 12. Housing 12 includes a base 14, a wall portion 16 extending from base 14, and a top 18, depicted partially in FIG. 1. Housing 12 includes a chamber 20 depicted in its open configuration on FIG. 1 since top 18 is shown in part. Chamber 20 includes an entrance 22 and an exit 24. Directional arrows 26, 28, 30, and 32 generally depict the movement of wind into chamber 20, within chamber 20, and outwardly through exit 24.

Figure 2:
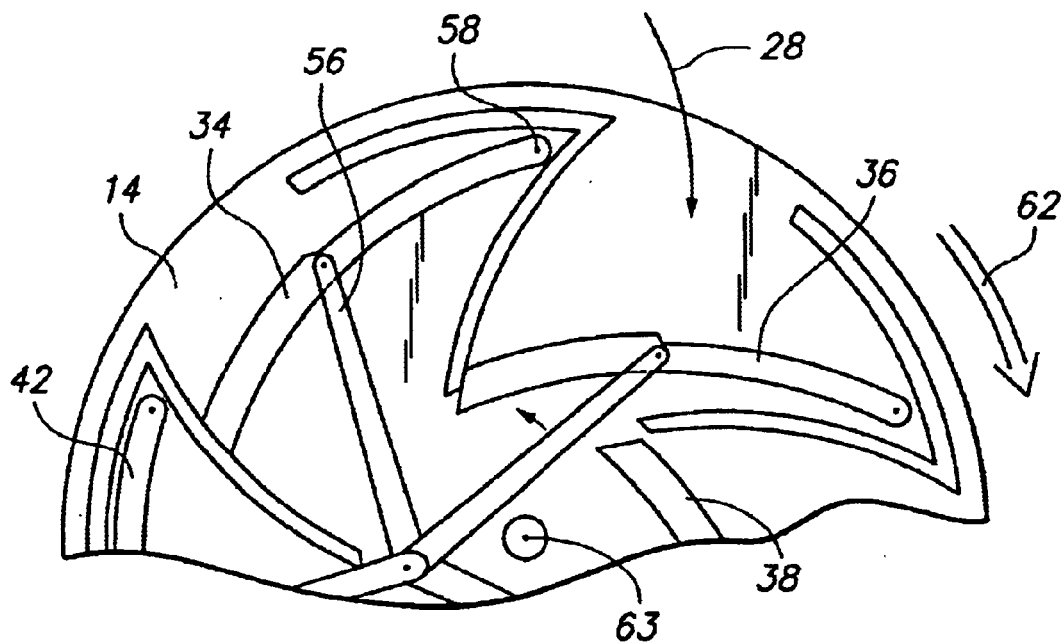
FIG. 2 is a broken top plan view of the apparatus of FIG. 1 showing the turning of the vanes within the housing.
Figure 3:
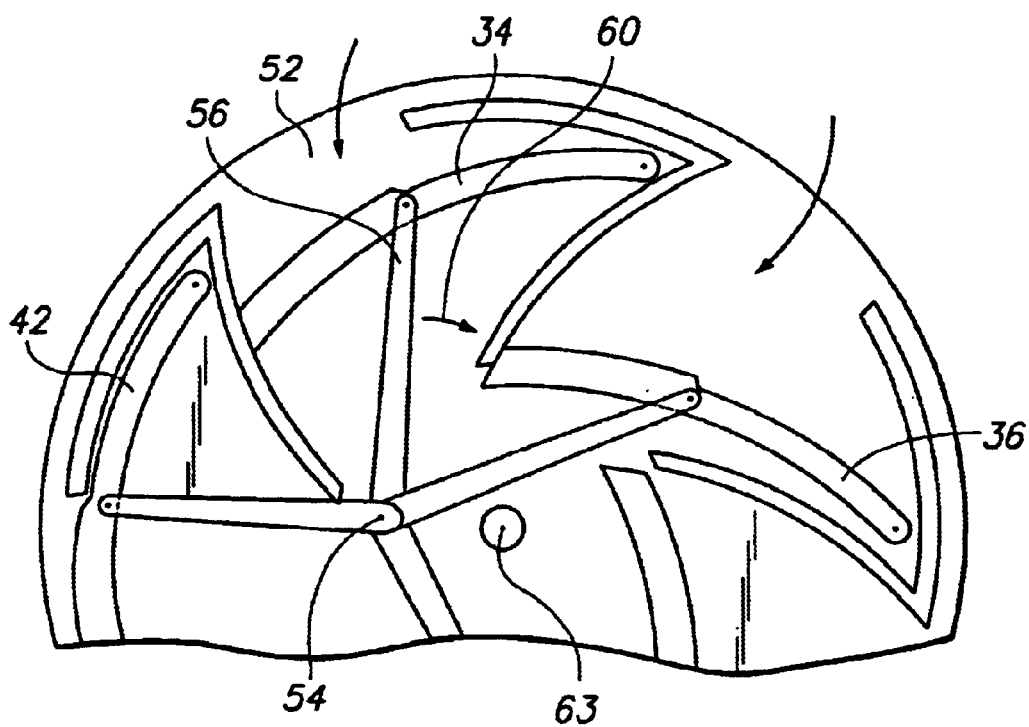
FIG. 3 is a broken top plan view of the apparatus in FIG. 1 showing the progression of the turning of the vanes of the apparatus of the present invention.

Apparatus 10A includes a plurality of movable vanes 34, 36, 38, 40, and 42 and a plurality of partitions and stators 47. Each vane and partition is similarly constructed. Thus, with respect to vane 34, a hinge 44 allows vane 34 to rotate. Vane 34 includes an end portion 46 which moves along an arcuate path. A partition or stator 48 is provided with a surface 50 which is curved or arcuate to coincide with the movement of end portion 46 of vane 34. The movement of end portion 46 of vane 34 along surface 50 of partition 48 forms a pocket 52 to collect wind passing through entrance 22 of chamber 20, noted by directional arrow 28. A rotatable crank shaft 54 extends a plurality of arms 55 which pivotally attaché to vanes 34, 36, 38, 40, and 42. Plurality of arms 55 are supported by element 57 which is held by top 18. Specifically arm 56 attaches to vane 34 via wrist pin or pivot 58. Thus, arm 56 rotates according to directional arrow 60. Such vane movement also takes place with respect to vanes 36, 38, 40, and 42 and causes base 14 to rotate around a pivot 62 boss located on central axis 63. FIGS. 2 and 3 more fully show the operation of vanes 34, 36, 38, 40, and 42 by focusing on the operation of vane 34. As may be observed from FIGS. 2 and 3, vane 34 is moved counterclockwise about pivot 58 while base 14 has traveled clockwise, directional arrow 61.

Figure 4:
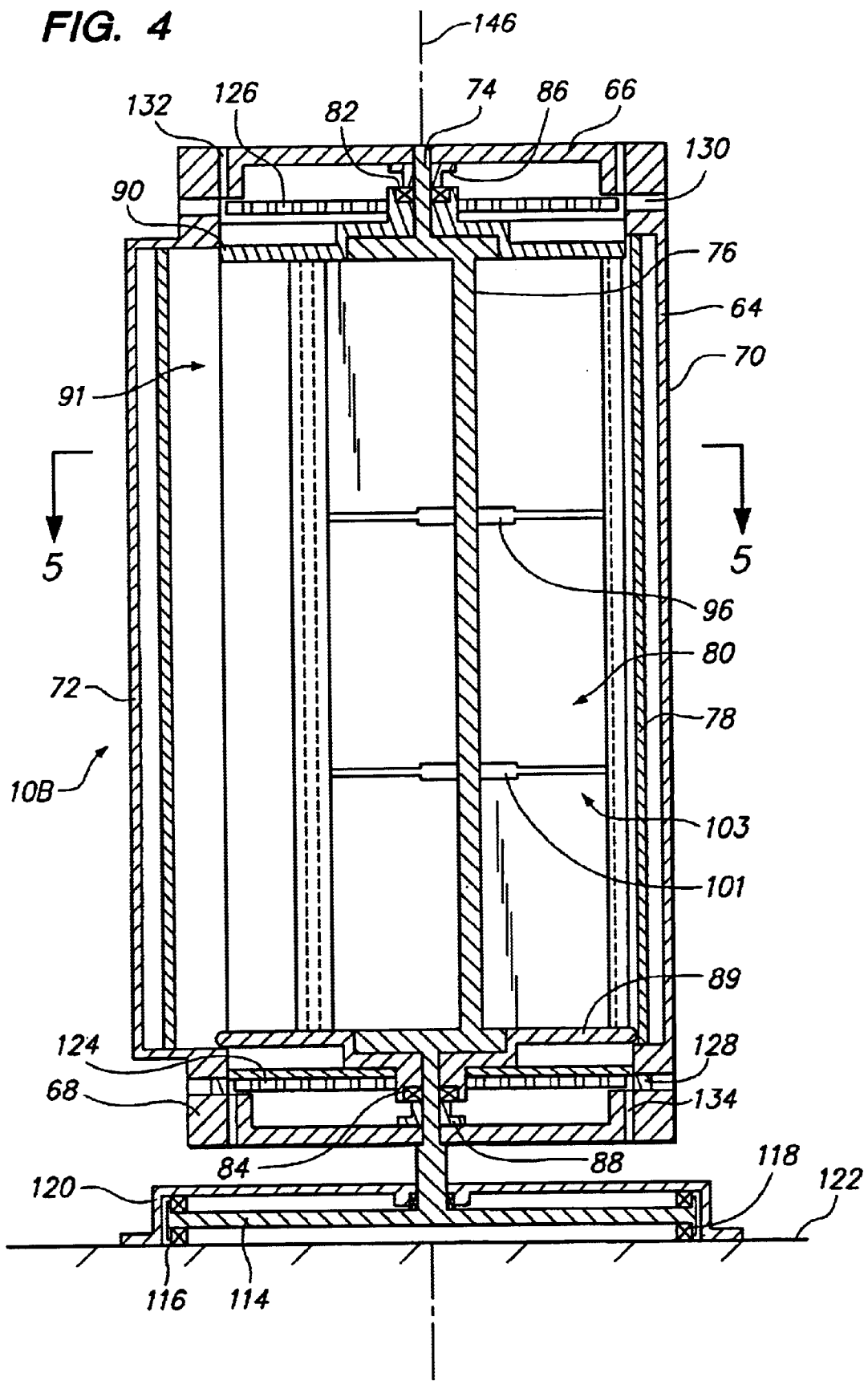
FIG. 4 is a sectional view of an alternate embodiment of the apparatus of the present invention.
Figure 5:
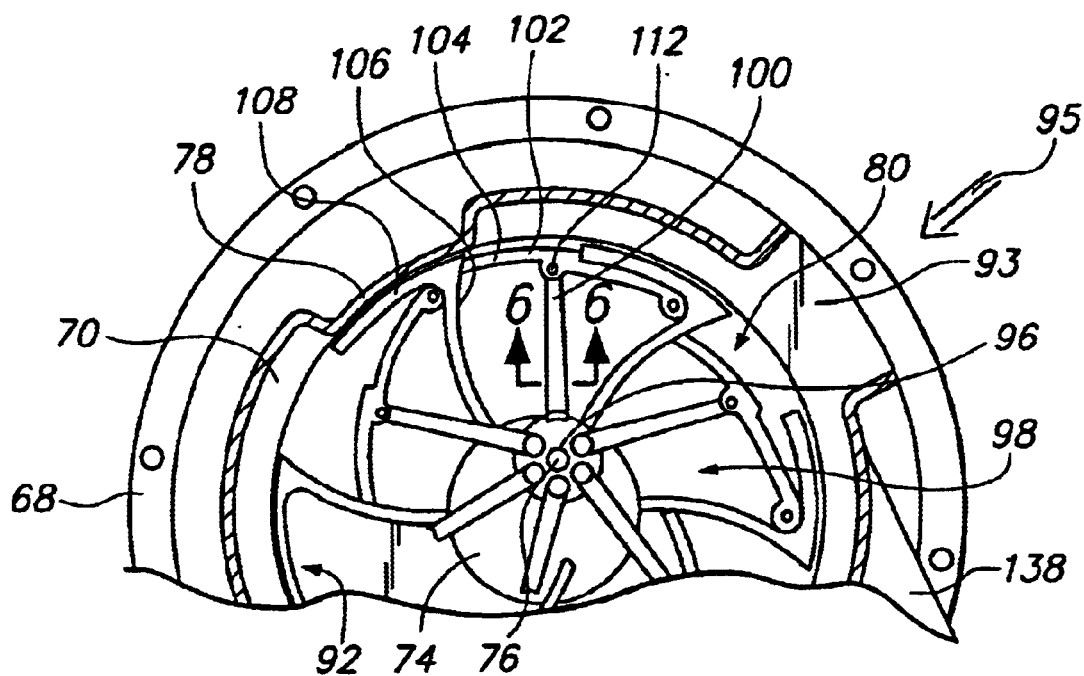
FIG. 5 is a sectional view of the apparatus of FIG. 4 taken along line 5—5 of FIG. 4.

Turning now to FIGS. 4 and 5, another embodiment 10B of the present invention is shown. Windmill 10B is a vertically extended version of windmill 10A of FIGS. 1–3. In essence, windmill 10B includes a housing 64 having a top plate 66 and a bottom plate 68 with sidewall 72, therebetween. A chamber 70 has been formed by internal wall 78 extending between bottom plate 68 and top plate 66. A central shaft 74 rotates and includes an offset crank portion 76. Plurality of vanes 80 move within chamber 70 in the same manner as vane 34 of embodiment 10A. Plates 89 and 90 connect to plurality of vanes 80 to form a rotor assembly 91. Bearings 82 and 84 permit shaft 74 to rotate relative to housing 70. Slip rings 86 and 88 further stabilize shaft 74 and serve as a place for an electronic pickup if the same is desired.

Turning to FIG. 5, plurality of partitions 92, similar to partition 48 of embodiment 10A, lie within chamber 70 and define opening 93 to chamber 70. Crank shaft 74 with offset crank portion 76 possesses a disk 96 serving as a base for a plurality of rods 98. For example, master rod 100 extends from disk 96 and pivotally attaches to vane 102. Vane 102 includes an end portion 104 which rides an arcuate path on surface 106 of stator or partition 108. Another disk 101 and plurality of rods 103 are similarly constructed relative to disk 96 and plurality of rods 98. Disk 101 and plurality of rods 103 lie along axis 146.

Figure 6:
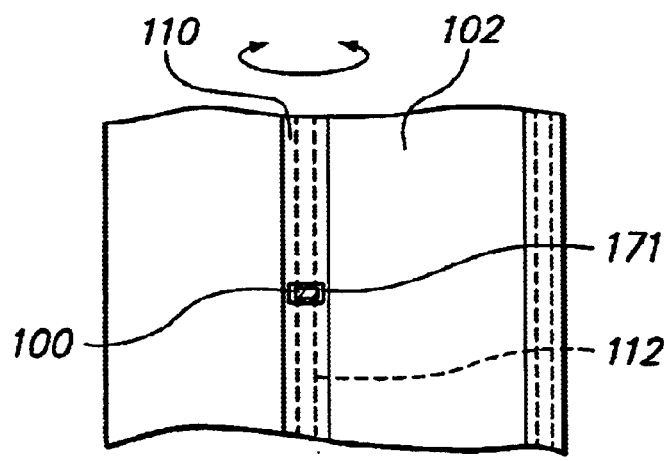
FIG. 6 is a sectional view taken along line 6—6 of FIG. 5.

With reference to FIG. 6 it may be observed that rod 100 extends through a slot portion 111 of vane 102, namely shoulder 110, to intercept hinge pin 112.

Referring again to FIG. 4, it may be seen that shaft 74 terminates in a disk 114 which is held by bearings 116 and 118. Disk 114 lies beneath a stand 120 which sits on ground surface 122. Plate mounted coils 124 and 126, attached to plates 89 and 90, respectively, may be used together or alternatively to generate electrical energy. Coil pickup 128 is shown in FIG. 7, however, coil pickups may be placed in slots 130, 132 or 134.

Figure 7:
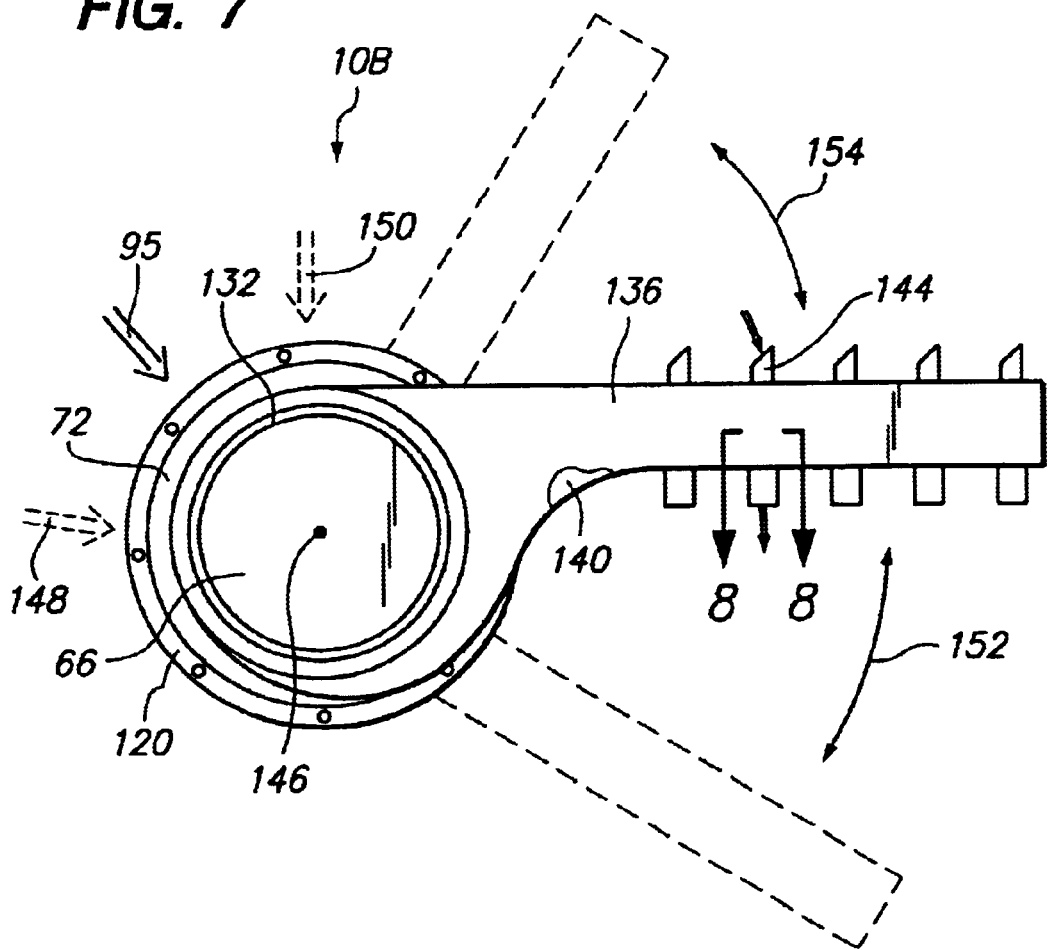
FIG. 7 is a top plan view of the embodiment of FIG. 4 showing the rotation of the housing relative to changes in direction of wind.
Figure 8:
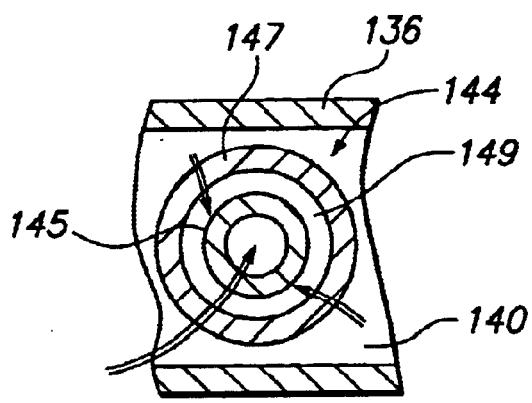
FIG. 8 is a sectional view taken along line 8—8 of FIG. 7.

Turning now to FIGS. 7 and 8, it may be observed that embodiment 10B is depicted in plan view showing a chute 136 having a passageway 140 therethrough. Chute 136 orients to intercept the wind and aid in the positioning of windmill entrance 93 into wind 95. A plurality of venturi tubes 142, exemplified by venturi tube 144, aids in the movement of windmill 10B about central axis 46. Venturi 144 includes a relatively small tube 145 which extends, leaving an annular gap 149 which communicates with passageway 140. As the wind changes direction according to directional arrows 95, 148, and 150 windmill 10B rotates accordingly about axis 146, shown in phantom on FIG. 7, directional arrows 153 and 154. Venturi tubes 144 create a slight vacuum in passageway 140 which aids in the movement of plurality of vanes 80 within windmill apparatus 10B.

In operation, the user places apparatus 10A or 10B in an area having sufficient wind to drive the same. With respect to embodiment 10A, wind enters entrance 22 of housing 12. The wind impinges on any one of the vanes available at this point. For example, vane 34 on FIG. 1 accepts the wind such that the end portion 46 moves in an arcuate path along surface 50 of partition or stator 48. The base 14 is then turned clockwise about pivot 62. Wind passing through plurality of vanes 34, 36, 38, 40, and 42 and associated partitions 47 migrates to exit 24 of housing 12 and passes into a chute, such as that shown on embodiment 10B as chute 142. FIGS. 2 and 3 represent the progression of vanes 34, 36, 38, 40 and 42 in their movements relative to the plurality of partitions or stators 47 found within apparatus 10A. The same operation takes place in apparatus 10B except that the plurality of vanes 80 extend vertically to a larger extent and the connection between the rods 98, 103 extending from the central disks 96, 101, respectively connect to the particular hinge pins in the plurality of vanes 80 through a slot, exemplified by rod 100 and slot 111 of FIG. 6. As the wind direction changes, FIG. 7, the rotor assembly 91 continues to turn around axis 146 and chute 142 will rotate to align opening 93 to chamber 70 into the wind, directional arrows 95, 148 and 150. Chute or tail piece 142 will aid in the establishment in a reduced pressure at the exit 24 of chamber 20 of apparatus 10A or the exit 138 chamber 70 of apparatus 10B to reinforce the turning of base 14 of apparatus 10A or rotor assembly 91 of apparatus 10B. The energy obtained from apparatus 10A or 10B may be used in a mechanical application or to generate electrical power as illustrated in FIG. 4, through plate mounted coils 124, 126 and exemplar coil pickup 128.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A windmill apparatus positioned relative to a ground surface, comprising:

a. a housing having a base, a wall portion extending therefrom, and a top overlying said wall portion, said housing having a chamber with a wind entrance thereto and an exit therefrom;

b. at least one vane located within said housing chamber said vane including a hinge for rotating said one vane relative to said housing wall portion, said vane including an end portion located distally from said hinge, said vane end portion moving in an arcuate path;

c. a partition located within said chamber said partition including a leg having an arcuate surface, said end portion of said one vane moving in said arcuate path immediately adjacent said arcuate surface of said partition to form a pocket for wind entering said chamber through said chamber entrance; and d. a rotatable crank shaft, said crank shaft including an arm extending therefrom, said arm further including an end portion pivotally attached to said vane between said hinge and said end portion of said vane.

2. The apparatus of claim 1 which additionally comprises means for turning said base relative to the ground surface.

3. The apparatus of claim 1 in which said one vane comprises a curved member.

4. The apparatus of claim 1 in which said partition leg comprises a first leg and said partition further comprises a second leg angularly connected to said first leg.

5. The apparatus of claim 1 which further comprises a chute having a passageway therethrough, said chute passageway communicating with said exit of said housing chamber.

6. The apparatus of claim 5 in which said chute passageway includes an exit.

7. The apparatus of claim 5 in which said chute further comprises at least one venturi nozzle exiting said passageway apart from said exit of said passageway.

8. The apparatus of claim 1 in which said at least one vane comprises a first vane and said partition comprises a first partition and which further comprises a second vane located within said chamber, said second vane including a hinge for rotating said second vane relative to said housing wall portion, said second vane including an end portion located distally from said hinge, said vane end portion moving in an arcuate path and a second partition, said second partition including an arcuate surface, said end portion of said second vane moving in said arcuate path adjacent said arcuate surface of partition to form a pocket for wind entering said chamber, through said chamber entrance, said rotatable crank shaft including an arm having an end portion pivotally attached to said second vane between said hinge and said end portion of said second vane.

9. The apparatus of claim 8 which additionally comprises means for turning said base relative to the ground surface.

10. The apparatus of claim 8 in which said one vane comprises a curved member.

11. The apparatus of claim 8 in which said partition leg comprises a first leg and said partition further comprises a second leg angularly connected to said first leg.

12. The apparatus of claim 8 which further comprises a chute having a passageway therethrough, said chute passageway communicating with said exit of said housing chamber.

13. The apparatus of claim 12 in which said chute passageway includes an exit.

14. The apparatus of claim 12 in which said chute further comprises at least one venturi nozzle exiting said passageway apart from said exit of said passageway.

15. The apparatus of claim 1 which additionally comprises a turntable and said housing lies on said turntable.

\* \* \* \* \*